United States Patent
DeSantis et al.

(10) Patent No.: US 8,297,303 B2
(45) Date of Patent: Oct. 30, 2012

(54) SELF CLEANING VALVE ASSEMBLY

(75) Inventors: Paul M. DeSantis, Racine, WI (US);
Ryan D. Carignan, Racine, WI (US)

(73) Assignee: Emerson Electric Co., St. Louis, MO (US)

( * ) Notice: Subject to any disclaimer, the term of this patent is extended or adjusted under 35 U.S.C. 154(b) by 260 days.

(21) Appl. No.: 12/887,062

(22) Filed: Sep. 21, 2010

(65) Prior Publication Data

US 2011/0073194 A1   Mar. 31, 2011

Related U.S. Application Data

(60) Provisional application No. 61/247,001, filed on Sep. 30, 2009.

(51) Int. Cl.
*F16K 3/26* (2006.01)
*F16K 31/52* (2006.01)

(52) U.S. Cl. .................................. 137/242; 251/263

(58) Field of Classification Search ............... 137/242; 251/231, 242, 244, 245, 253, 251, 262, 263
See application file for complete search history.

(56) References Cited

U.S. PATENT DOCUMENTS

| | | | | |
|---|---|---|---|---|
| 920,612 A * | 5/1909 | Murphy | ........................ | 239/445 |
| 2,838,104 A * | 6/1958 | Midtlyng | ................. | 137/315.39 |
| 3,026,908 A * | 3/1962 | Blair | ........................... | 137/627.5 |
| 4,298,183 A * | 11/1981 | Kawakami | ..................... | 251/263 |
| 5,417,348 A | 5/1995 | Perrin et al. | | |
| 6,978,795 B2 | 12/2005 | Perrin | | |
| 6,994,318 B2 * | 2/2006 | Burke | ............................ | 251/251 |
| 7,096,879 B2 | 8/2006 | Yardley | | |

\* cited by examiner

*Primary Examiner* — John Rivell
*Assistant Examiner* — Angelisa Hicks
(74) *Attorney, Agent, or Firm* — Harness, Dickey & Pierce, P.L.C.

(57) ABSTRACT

A self cleaning valve assembly includes a valve body having an internal valve cavity. A cylinder member received in the valve cavity has a first sealing surface and a cylinder wall, and divides the valve cavity into a liquid-free cavity portion and a flow cavity portion. A spindle includes a spindle body contacting the first sealing surface to continuously prevent pressurized fluid in the flow cavity portion from entering the liquid-free cavity portion. A spindle piston end has a wiper member in a receiving groove frictionally contacting the cylinder wall. A handle pinned to the valve assembly directly contacts the piston end. Handle rotation displaces the spindle from a valve closed to a valve open position permitting pressurized fluid flow into the flow cavity portion. The wiper member wipes a contaminant off the cylinder wall and further prevents contaminant entrance into the liquid-free cavity portion.

20 Claims, 5 Drawing Sheets

SELF CLEANING VALVE ASSEMBLY

CROSS-REFERENCE TO RELATED APPLICATIONS

This application claims the benefit of U.S. Provisional Application No. 61/247,001, filed on Sep. 30, 2009. The entire disclosure of the above application is incorporated herein by reference.

FIELD

The present disclosure relates to spindles for faucet valve assemblies.

BACKGROUND

This section provides background information related to the present disclosure which is not necessarily prior art.

Valve assemblies used in faucet applications can include a spindle acting as a flow restricting member. Spindles having O-ring seals used to contact and release from a sealing surface to isolate a pressurized fluid from a flow port are known. Spindle valves are susceptible to entrance of a contaminant such as dirt, food products, and/or cleaning agents which upon drying in the valve assembly can crystallize and produce sharp crystalline particles. Entrance of these contaminants into the valve assembly can corrode internal components and/or cause the spindle to bind in position, which can result in a continuously dripping or flowing condition which wastes water. Excessive force used to close a sticking valve assembly can result in damage to valve internal members, and further displacement of a valve member which has surface contaminants thereon can grind away sealing or contact surfaces which further compounds the leaking condition.

SUMMARY

This section provides a general summary of the disclosure, and is not a comprehensive disclosure of its full scope or all of its features.

According to several embodiments, a self cleaning valve assembly includes a valve body having an internal valve cavity; and a cylinder member received in the valve cavity having a first sealing surface and a cylinder wall. The cylinder member divides the valve cavity into a liquid-free cavity portion and a flow cavity portion. A spindle includes a spindle body in sealing contact with the first sealing surface to continuously prevent a pressurized fluid in the flow cavity portion from entering the liquid-free cavity portion. A piston end of the spindle includes a wiper member received in a receiving groove in continuous frictional contact with the cylinder wall. A handle is rotatably pinned to the valve assembly and directly contacts the piston end such that rotation of the handle displaces the spindle from a valve closed to a valve open position permitting flow of the pressurized fluid into the flow cavity portion. Displacement of the spindle causes the wiper member to wipe a contaminant off the cylinder wall. The wiper member further prevents entrance of the contaminant into the liquid-free cavity.

According to further embodiments a self cleaning valve assembly includes a valve body having an internal valve cavity. A U-shaped cylinder member received in the valve cavity has a sealing surface and a cylinder wall, and divides the valve cavity into a liquid-free cavity portion and a flow cavity portion. A spindle includes a spindle body having a first O-ring seal received in a first O-ring groove and a second O-ring seal received in a second O-ring groove. The second O-ring seal is in continuous sealing contact with the sealing surface in each of a valve closed and a valve open position to prevent a pressurized fluid in the flow cavity portion from entering the liquid-free cavity portion. A piston end of the spindle has a wiper member received in a receiving groove in continuous frictional contact with the cylinder wall. A handle rotatably pinned to the valve assembly has an extending portion directly contacting the piston end such that rotation of the handle causes the extending portion to displace the spindle from the valve closed to the valve open position permitting flow of the pressurized fluid past the first O-ring seal into the flow cavity portion. Displacement of the spindle causes the wiper member to wipe a contaminant off the cylinder wall. The wiper member further prevents entrance of the contaminant into the liquid-free cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
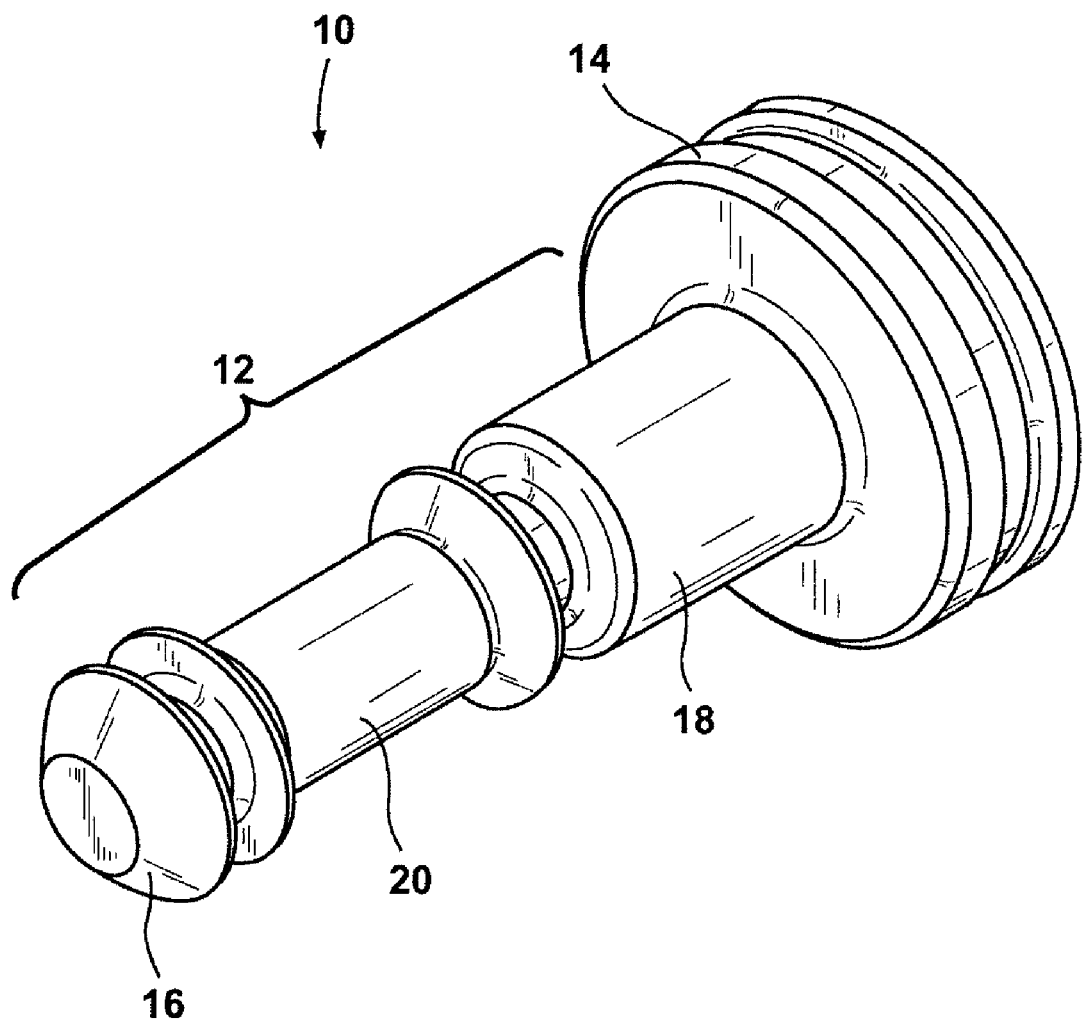
FIG. 1 is a right front perspective view of a spindle for a self cleaning valve assembly of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a spindle 10 of the present disclosure includes a spindle body 12 extending from and connected to a piston end 14. Spindle body 12 includes a first cylindrical portion 16 and a second cylindrical portion 18 which are spaced from each other by a third cylindrical portion 20. A diameter of third cylindrical portion 20 is smaller than a diameter of both first and second cylindrical portions 16, 18 for reasons which will be further discussed in further reference to FIG. 5.

Figure 2:
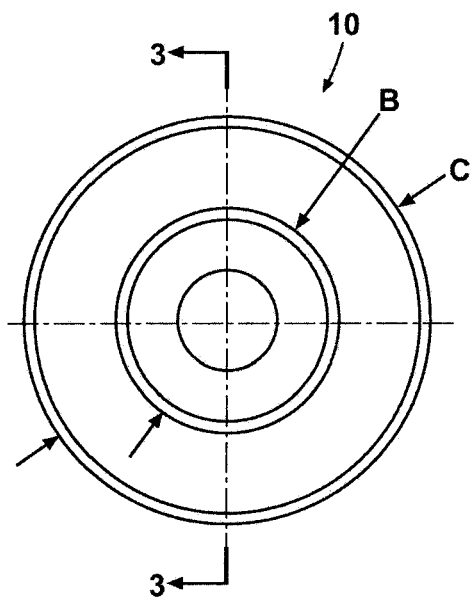
FIG. 2 is an end elevational view of the spindle of FIG. 1.
Figure 3:
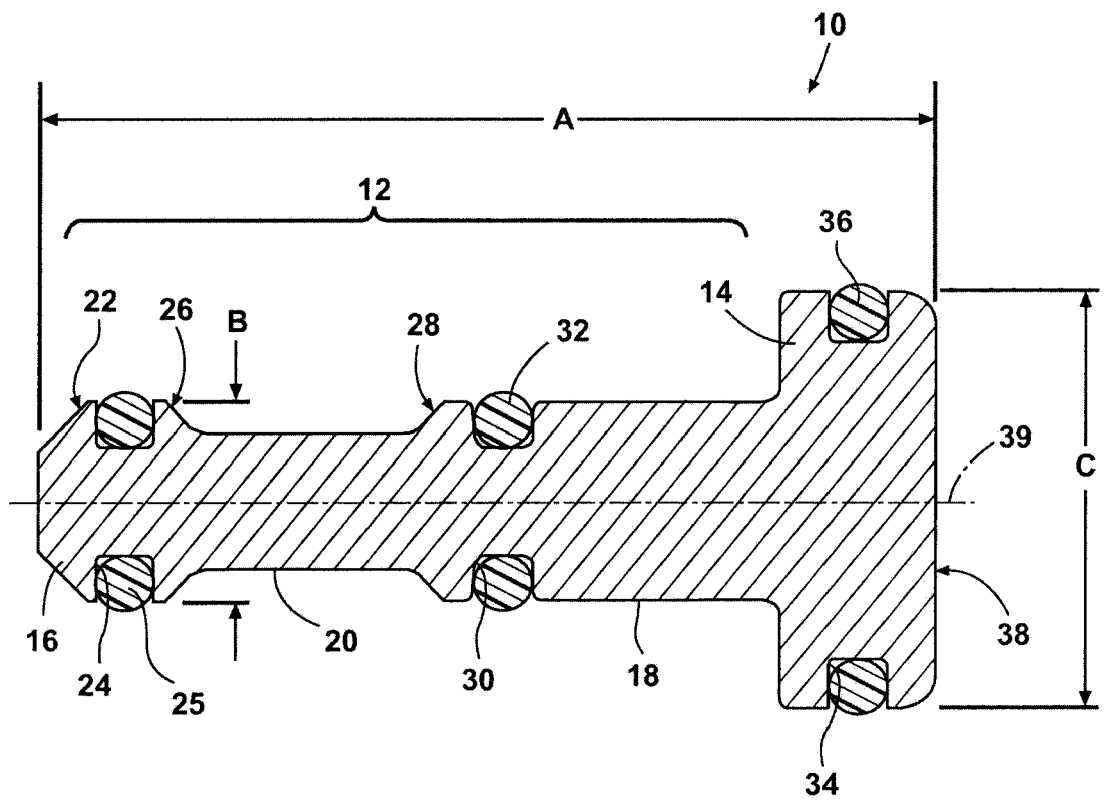
FIG. 3 is a cross sectional front elevational view taken at section 3 of FIG. 2.

Referring to FIGS. 2 and 3, spindle 10 can have a spindle length "A" which includes spindle body 12 plus piston end 14. Spindle length "A" can be varied to suit a size and desired flow rate for a faucet or a valve assembly. First cylindrical portion 16 can include a conical face 22 at a free end of spindle body 12. A first O-ring groove 24 is created in first cylindrical portion 16 which receives a first O-ring 25. Both first cylindrical portion 16 and second cylindrical portion 18 can include a common spindle body diameter "B". A diameter reducing portion 26 such as a conical shaped surface can be used to transition from the spindle body diameter "B" to the smaller diameter of third cylindrical portion 20.

A diameter increasing portion 28 such as a conical shaped surface can be used to transition from the diameter of third cylindrical portion 20 to the larger body diameter "B" of second cylindrical portion 18. A second O-ring groove 30 which receives a second O-ring 32 is created in second cylindrical portion 18. A wiper member receiving groove 34 is created in an outer perimeter wall of piston end 14 which receives a wiper member 36. Wiper member 36 can include a resilient member such as an O-ring, or a gasket. Piston end 14 has a diameter "C" which is larger than spindle body diameter "B". A contact face 38 of piston end 14 is oriented substantially transverse to a longitudinal axis 39 of spindle 10.

Referring to FIG. 4 and again to FIGS. 1-3, a spindle 10' is modified from the design of spindle 10 by further inclusion of a recess 40 created in piston end 14' by removing a portion of the material of piston end 14' from contact face 38' such that recess 40 is coaxially aligned with longitudinal axis 39'. The function of recess 40 will be described in reference to FIG. 5.

Figure 5:
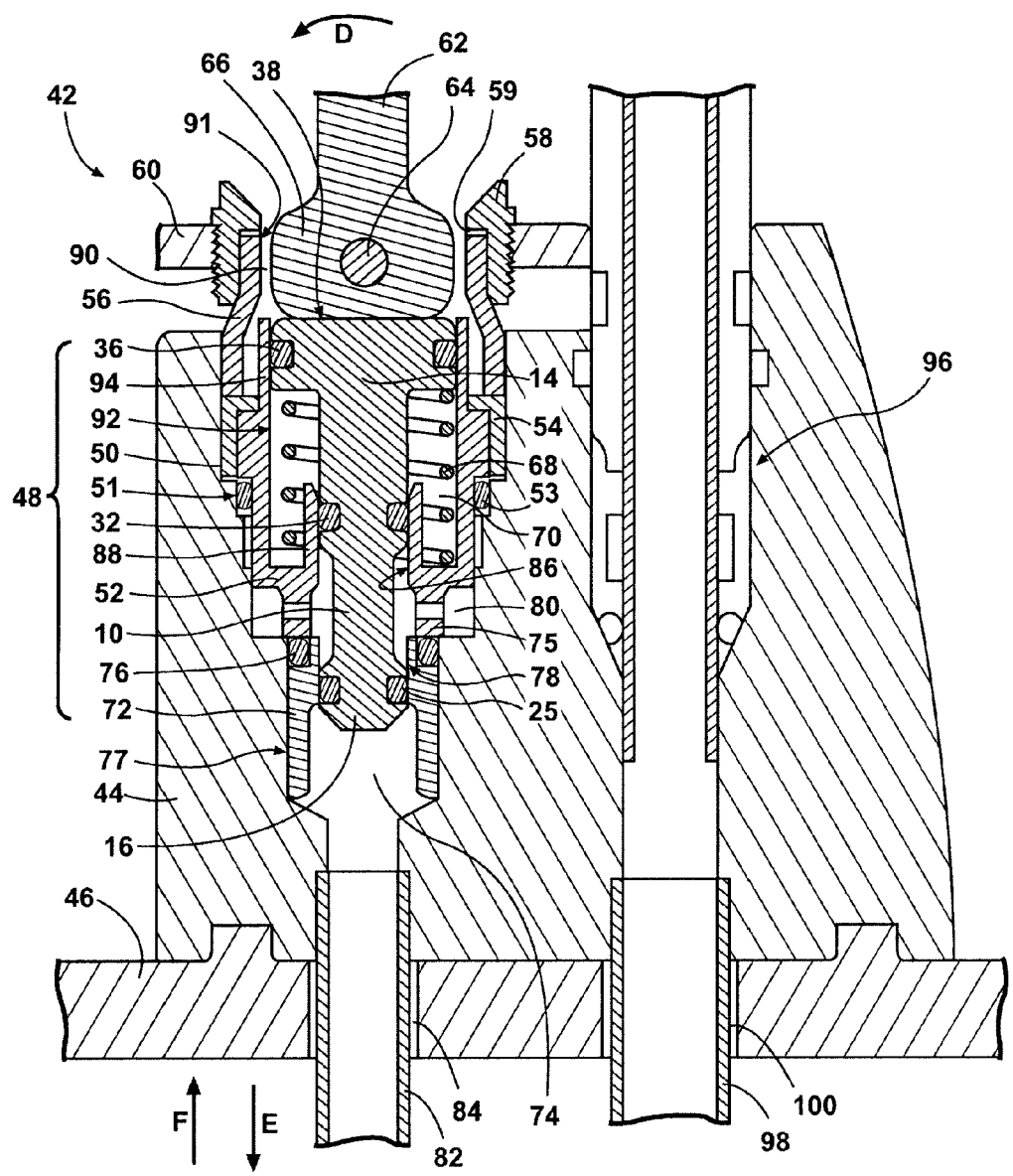
FIG. 5 is a cross sectional front elevational view of a valve assembly having the spindle of FIG. 1.

Referring to FIG. 5, spindle 10 of the present disclosure can be incorporated in a valve assembly 42 used to control the flow of a fluid such as water in an application such as a faucet for a sink or wash tub. Valve assembly 42 includes a valve body 44 which is releasably connected to a mounting surface 46 such as a sink surface. A valve sub-assembly 48 is releasably mounted within a valve cavity 50 of valve body 44. Valve sub-assembly 48 includes a U-shaped cylinder member 52 received in valve cavity 50 and sealed against an inner wall 51 of valve cavity 50 using an O-ring seal 53. U-shaped cylinder member 52 is retained in valve cavity 50 using a retention sleeve 54 which is engaged by a carrier member 56 when a coupling nut 58 is threadably received in an outer jacket 60 of valve body 44. Coupling nut 58 applies contact pressure to carrier member 56, retention sleeve 54, and U-shaped cylinder member 52. A seating member or washer 59 can also be positioned between coupling nut 58 and contact member 56.

A manually actuated handle 62 (only partially shown) extends freely away from valve body 44. Handle 62 can be rotatably mounted to contact member 56 using a pin 64. Handle 62 includes an extending portion 66 which directly contacts contact face 38 of piston end 14 when handle 62 is rotated in a lever rotation arc "D". Direct contact between extending portion 66 and contact face 38 displaces spindle 10 in a valve opening direction "E" against the biasing force of a biasing member 68. Biasing member 68 can be a metal or polymeric material spring such as a compression spring which is seated in a liquid-free cavity 70. Biasing member 68 contacts each of U-shaped cylinder member 52 and piston end 14. A biasing force created by biasing member 68 continuously biases spindle 10 in a valve closing direction "F". When handle 62 is released following displacement in the lever rotation arc "D", biasing member 68 returns spindle 10 to the valve closed position shown in FIG. 5 and returns handle 62 to its pre-rotated position shown. The position of spindle 10 shown in valve sub-assembly 48 in FIG. 5 is therefore the furthest upward or valve closed position of spindle 10.

The first cylindrical portion 16 of spindle 10 is slidably received within a bushing 72. Bushing 72 is slidably received in a pressurized fluid cavity 74 of valve body 44 which communicates with valve cavity 50. Bushing 72 is retained in the position shown by contact with an extending end 75 of cylinder member 52. A bushing O-ring seal 76 is provided between bushing 72 and a fluid cavity wall 77 defined by pressurized fluid cavity 74 of valve body 44, creating a fluid pressure boundary between these two components. In the valve closed position, first O-ring 25 creates a second fluid pressure boundary with bushing 72 by contact with an inwardly raised sealing surface 78 created within bushing 72. Both O-ring seal 76 and first O-ring 25 prevent pressurized fluid in pressurized fluid cavity 74 from entering a flow cavity portion 80 when spindle 10 is in the valve closed position shown.

Fluid in pressurized fluid cavity 74 can flow into flow cavity portion 80 by rotational displacement of handle 62 in the lever rotation arc "D" which displaces spindle 10 in the valve opening direction "E". Spindle 10 displacement (downward as viewed in FIG. 5) continues until first O-ring 25 is repositioned below or free from contact with raised sealing surface 78 which creates a flow path for fluid in pressurized fluid cavity 74 to flow past first cylindrical portion 16 and into flow cavity portion 80. The smaller diameter of third cylindrical portion 20 provides clearance for flow of the pressurized fluid into flow cavity portion 80. A throttling effect can also be provided by limiting the axial displacement of first cylindrical portion 16 depending on the rotation of handle 62 in lever rotation arc "D". Fluid such as hot or cold water is continuously present in pressurized fluid cavity 74 via a first supply tube 82 which extends through a first aperture 84 created in mounting surface 46. A joint such as a soldered or a swaged/sealed connection is created between first supply tube 82 and valve body 44.

In every operating position of spindle 10 second O-ring 32 is in continuous sealing contact with a second sealing surface 86 defining an inner perimeter wall of an inner tubular portion 88 of U-shaped cylinder member 52. Fluid reaching flow cavity portion 80 is therefore prevented from further flowing into liquid-free cavity 70 by second O-ring 32. "Liquid-free" as used herein is defined as the substantial absence in any operating condition of the valve assembly of water or liquid originating from a source of pressurized liquid or fluid such as pressurized hot or cold water. Atmospheric air or air containing moisture due to atmospheric humidity can be present in liquid-free cavity 70 by entrance proximate the handle 62 and past piston end 14 and wiper member 36.

Based on the geometry of extending portion 66 of handle 62, a clearance opening 90 is necessary between extending portion 66 and an inner wall 91 of contact member 56. This allows for free rotation of handle 62 but also simultaneously creates a path for a contaminant such as dirt, food particles, and/or cleaning chemicals to enter valve body 44 and contact piston end 14 of spindle 10. To mitigate against these contaminants entering liquid-free cavity 70, wiper member 36 is positioned in continuous sliding contact with a cylinder wall 92 of a cylinder sleeve portion 94 of U-shaped cylinder member 52. Wiper member 36 pushes out contaminants such as dirt, food particles, or chemical cleaning solution which contact the exposed portion of piston end 14 or which contact the exposed portion of cylinder wall 92 back outward toward clearance opening 90 when spindle 10 returns by biasing force in the valve closing direction "F" upon release of handle 62. Wiper member 36 therefore mitigates contaminant contact with any of the interior portions of valve sub-assembly 48 which could cause binding of piston end 14 with cylinder wall 92. Although wiper member 36 is represented as an O-ring, wiper member 36 can also be a washer or gasket made from a resilient material, or a polymeric material which is softer than the material of spindle 10. Use of wiper member 36 permits an increased clearance gap between piston end 14 and cylinder wall 92 which allows free sliding motion of spindle 10.

A second valve assembly 96 which can be used for example for the other of a hot or a cold water service can also be included with valve body 44. Second valve assembly 96 receives fluid from a second supply tube 98 extending through a second aperture 100 created through mounting surface 46. Valve assembly 42 can therefore be used to provide each of a hot and a cold water flow. Because wiper member 36 does not have to perform the function of a fluid boundary pressure seal, the pressure contact between wiper member 36 and cylinder wall 92 can be lower than that normally provided between an O-ring and its sealing contact wall when a fluid pressure boundary is desired. This permits the O-ring or gasket used for wiper member 36 to have a higher durometer or stiffness compared to a sealing O-ring to provide a scraping action by wiper member 36. The stiffness of biasing member 68 can be unchanged with respect to an embodiment of valve sub-assembly 48 which does not include wiper member 36.

Wiper member 36 used in conjunction with spindle 10 of the present disclosure offers several advantages. Spindle assemblies known in the art lacking a wiper member permit a crystallized form of cleaning solutions or soil and/or food products entering into the valve assembly to harden and bind the free sliding motion of the spindle. Utilization of a wiper member of the present disclosure automatically precludes entry of contaminants into the liquid-free cavity 70 by a wiping action with each upstroke of spindle 10 in the valve closing direction "F". Because a wiping motion and not a sealing pressure is required for wiper member 36, the material for wiper member 36 and its contact pressure with cylinder wall 92 can be selected to reduce friction between the wiper member and cylinder wall 92.

Figure 4:
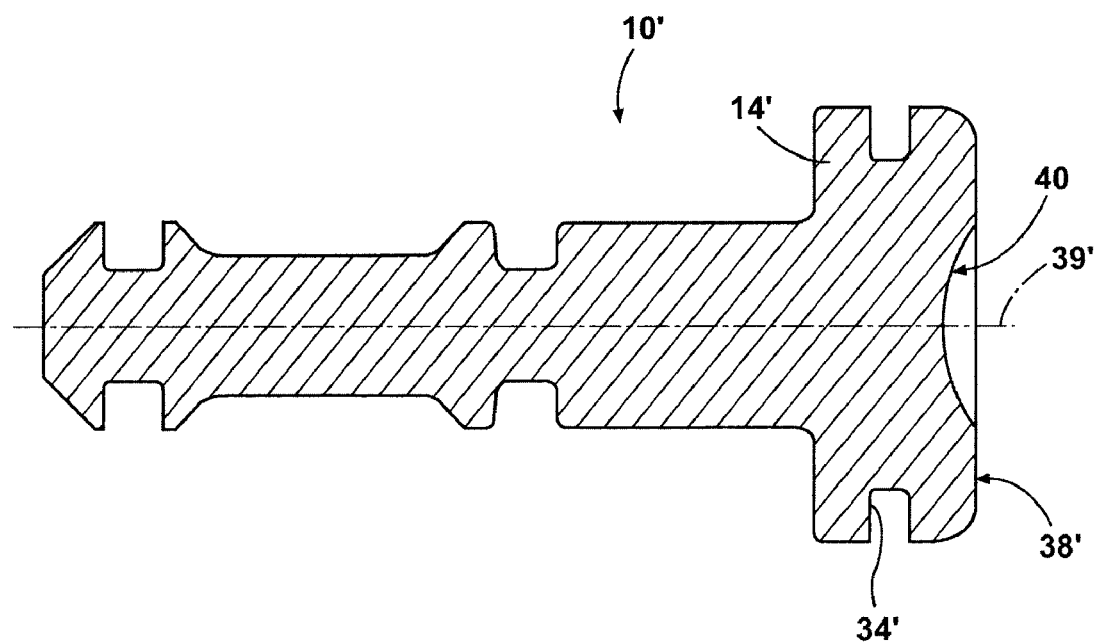
FIG. 4 is a cross sectional front elevational view similar to FIG. 3 of another embodiment of a spindle.

With further reference to both FIGS. 4 and 5, for cold water applications of valve sub-assembly 48, spindle 10' having recess 40 can be substituted. Use of spindle 10' permits the extending portion 66 of handle 62 to be partially received within recess 40 of the piston end 14'. This permits the handle 62 to be released with spindle 10' in the fully open position such that continuous fluid flow is possible without retaining contact with handle 62. For hot water applications, if it is undesirable to include the hands-free full flow condition provided by spindle 10', spindle 10 can be used in place of spindle 10'.

Figure 6:
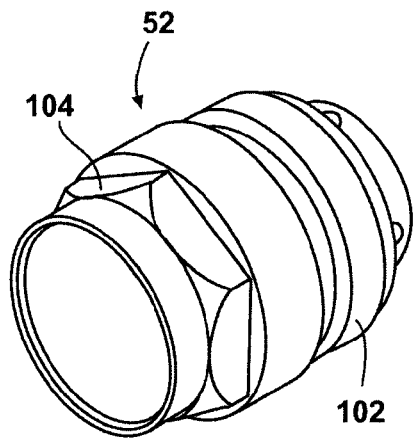
FIG. 6 is a right front perspective view of a cylinder member of the valve assembly.

Referring to FIG. 6 and again to FIG. 5, U-shaped cylinder member 52 includes a threaded body portion 102 used to threadably couple cylinder member 52 into valve body 44. A tool drive portion 104 can include multiple tool engagement faces to assist in rotating cylinder member 52 into engagement with valve body 44.

Referring to FIG. 7 and again to FIG. 5, extending end 75 has an engagement face 106 which contacts bushing 72 to retain bushing 72 in position within valve body 44. At least one and according to several embodiments a plurality of flow apertures 108 are perpendicularly created through extending end 75 which provide flow paths for fluid to flow into flow cavity portion 80.

Figure 7:
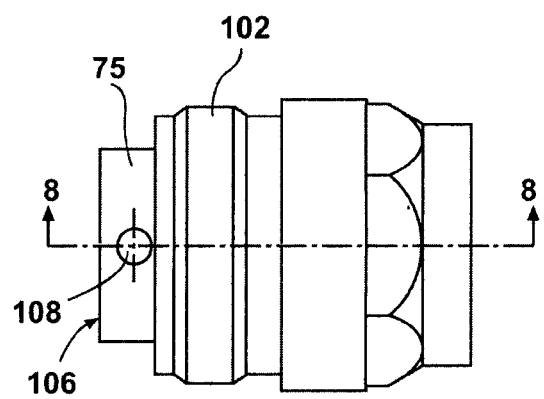
FIG. 7 is a front elevational view of the cylinder member of FIG. 6.
Figure 8:
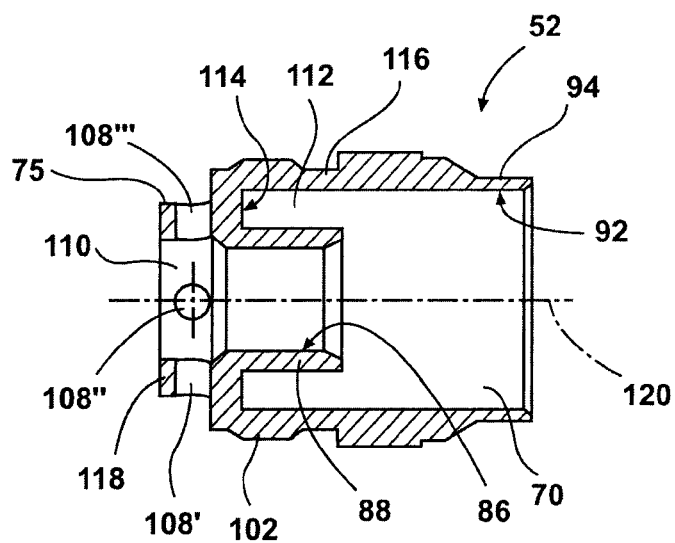
FIG. 8 is a cross sectional front elevational view taken at section 8 of FIG. 7.

Referring to FIG. 8 and again to FIGS. 5 and 7, pressurized fluid enters U-shaped cylinder member 52 via a fluid chamber 110 and as previously noted is prevented from entering liquid-free cavity portion 70 by sealing contact between second O-ring 32 and second sealing surface 86 of inner tubular portion 88. The biasing member 68 is positioned in a biasing member alignment slot 112 and contacts or seats against a biasing member contact face 114. Biasing member alignment slot 112 is created between inner tubular portion 88 and an outer cylinder portion 116. Threaded body portion 102 is created and extends axially on an outer side of outer cylinder portion 116. Cylinder wall 92 extends axially for a total length of cylinder sleeve portion 94 and outer cylinder portion 116. Each of the flow apertures 108 are created through a perimeter wall 118 of extending end 75 and are oriented transverse to a cylinder member longitudinal axis 120.

The foregoing description of the various embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A self cleaning valve assembly, comprising:
   a valve body having an internal valve cavity;
   a cylinder member received in the valve cavity having a first sealing surface and a cylinder wall, and dividing the valve cavity into a liquid-free cavity portion and a flow cavity portion;
   a spindle, including:
      a spindle body in sealing contact with the first sealing surface to continuously prevent a pressurized fluid in the flow cavity portion from entering the liquid-free cavity portion; and
      a piston end having a wiper member received in a receiving groove in continuous frictional contact with the cylinder wall, wherein axial displacement of the spindle causes the wiper member to wipe a contaminant off the cylinder wall, the wiper member further preventing entrance of the contaminant into the liquid-free cavity portion.

2. The self-cleaning valve assembly of claim 1, wherein the spindle includes a first O-ring seal received in a first O-ring groove and a second O-ring seal received in a second O-ring groove.

3. The self-cleaning valve assembly of claim 2, wherein the second O-ring seal is in continuous sealing contact with the first sealing surface in each of a valve closed and a valve open position to prevent the pressurized fluid in the flow cavity portion from entering the liquid-free cavity portion.

4. The self-cleaning valve assembly of claim 2, further comprising a bushing having a second sealing surface, the bushing received in a pressurized fluid cavity of the valve body, the first O-ring seal being in sealing contact with the second sealing surface in a valve closed position, preventing flow of the pressurized fluid from the pressurized fluid cavity into the flow cavity portion.

5. The self-cleaning valve assembly of claim 4, wherein in a valve open position the first O-ring seal is displaced freely past the second sealing surface permitting flow of the pressurized fluid past the first O-ring seal and into the flow cavity portion.

6. The self-cleaning valve assembly of claim 1, further comprising a biasing member positioned in continuous contact with both the cylinder member and the piston end of the spindle acting to continuously bias the spindle toward the valve closed position.

7. The self-cleaning valve assembly of claim 6, wherein the biasing member is positioned in the liquid-free cavity portion.

8. The self-cleaning valve assembly of claim 1, further comprising a handle rotatably pinned to the valve assembly and directly contacting the piston end such that rotation of the handle displaces the spindle axially from a valve closed to a valve open position permitting flow of the pressurized fluid into the flow cavity portion.

9. The self-cleaning valve assembly of claim 8, wherein the handle includes an extending portion, the extending portion acting to axially displace the spindle when the handle is rotated toward the valve open position.

10. A self cleaning valve assembly, comprising:
    a valve body having an internal valve cavity;
    a cylinder member received in the valve cavity having a first sealing surface and a cylinder wall, and dividing the valve cavity into a liquid-free cavity portion and a flow cavity portion;
    a spindle, including:
       a spindle body in sealing contact with the first sealing surface to continuously prevent a pressurized fluid in the flow cavity portion from entering the liquid-free cavity portion; and
       a piston end having a wiper member received in a receiving groove in continuous frictional contact with the cylinder wall; and
    a handle rotatably connected by a pin to the valve assembly and directly contacting the piston end such that rotation of the handle displaces the spindle from a valve closed to a valve open position permitting flow of the pressurized fluid into the flow cavity portion, wherein displacement of the spindle causing the wiper member to wipe a contaminant off the cylinder wall, the wiper member further preventing entrance of the contaminant into the liquid-free cavity portion.

11. The self-cleaning valve assembly of claim 10, wherein the spindle body includes a first cylindrical portion having a first O-ring, the first O-ring in sealing and sliding contact with an inwardly raised second sealing surface preventing the pressurized fluid in a pressurized fluid cavity from entering the flow cavity portion in the valve closed condition.

12. The self-cleaning valve assembly of claim 11, wherein rotation of the handle causes axial displacement of the spindle moving the first O-ring past the inwardly raised sealing surface against a biasing force of a biasing member to permit flow of the pressurized fluid to flow through a flow aperture created through an extending end of the cylinder member.

13. The self-cleaning valve assembly of claim 11, wherein the spindle body includes a second cylindrical portion larger than the first cylinder portion, the second cylindrical portion having a second O-ring, the second O-ring in sealing and sliding contact with the first sealing surface.

14. The self-cleaning valve assembly of claim 10, wherein the handle includes an extending portion extending outwardly away from the pin, the extending portion directly contacting the piston end when the handle is rotated to achieve the valve open position, and is not in contact with the piston end in the valve closed position.

15. A self cleaning valve assembly, comprising:
    a valve body having an internal valve cavity;
    a U-shaped cylinder member received in the valve cavity having a sealing surface and a cylinder wall, and dividing the valve cavity into a liquid-free cavity portion and a flow cavity portion;
    a spindle, including:
       a spindle body having a first O-ring seal received in a first O-ring groove and a second O-ring seal received in a second O-ring groove, the second O-ring seal in continuous sealing contact with the sealing surface in each of a valve closed and a valve open position to prevent a pressurized fluid in the flow cavity portion from entering the liquid-free cavity portion; and a piston end having a wiper member received in a receiving groove in continuous frictional contact with the cylinder wall; and a handle rotatably pinned to the valve assembly having an extending portion directly contacting the piston end such that rotation of the handle causes the extending portion to displace the spindle from the valve closed to the valve open position permitting flow of the pressurized fluid past the first O-ring seal into the flow cavity portion, wherein displacement of the spindle causing the wiper member to wipe a contaminant off the cylinder wall, the wiper member further preventing entrance of the contaminant into the liquid-free cavity portion.

16. The self-cleaning valve assembly of claim 15, wherein the piston end includes a diameter larger than the diameter of the spindle body.

17. The self-cleaning valve assembly of claim 16, wherein the spindle body includes:
- a first cylindrical portion having the first O-ring groove created therein;
- a second cylindrical portion having the second O-ring groove created therein; and
- a third cylindrical portion positioned between the first and second cylindrical portions, the third cylindrical portion having a diameter smaller than a diameter of the first and second cylindrical portions.

18. The self-cleaning valve assembly of claim 15, further comprising a biasing member positioned in continuous contact with both the U-shaped cylinder member and the piston end of the spindle acting to continuously bias the spindle toward the valve closed position.

19. The self-cleaning valve assembly of claim 18, wherein the biasing member is positioned in the liquid-free cavity portion.

20. The self-cleaning valve assembly of claim 15, further comprising a bushing having a second sealing surface, the bushing received in a pressurized fluid cavity of the valve body, the first O-ring seal being in sealing contact with a sealing surface in the valve closed position preventing flow of the pressurized fluid from the pressurized fluid cavity into the flow cavity portion, wherein displacement of the spindle to the valve open position displaces the first O-ring seal freely away from the sealing surface to permit flow of the pressurized fluid from the pressurized fluid cavity into the flow cavity portion.

* * * * *